US006284160B1

(12) United States Patent
Kiernicki et al.

(10) Patent No.: US 6,284,160 B1
(45) Date of Patent: Sep. 4, 2001

(54) METHOD AND APPARATUS FOR PRECISION INJECTION MOLDING OF FIBER OPTIC FERRULES

(75) Inventors: Leopold Kiernicki, Niles; James W. McGinley, Schaumburg; Philip W. Schofield, Oak Park, all of IL (US)

(73) Assignee: Stratos Lightwave, Inc., Harwood Heights, IL (US)

( * ) Notice: Subject to any disclaimer, the term of this patent is extended or adjusted under 35 U.S.C. 154(b) by 0 days.

(21) Appl. No.: 08/416,927

(22) Filed: Apr. 4, 1995

Related U.S. Application Data

(63) Continuation of application No. 08/225,517, filed on Apr. 11, 1994, now abandoned, which is a continuation of application No. 08/101,469, filed on Aug. 2, 1993, now abandoned, which is a continuation of application No. 07/829,408, filed on Feb. 3, 1992, now abandoned.

(51) Int. Cl.[7] .................................................. B29C 45/36
(52) U.S. Cl. ..................... 264/1.25; 264/328.7; 425/168; 425/572; 425/577; 425/DIG. 58
(58) Field of Search .............................. 264/328.1, 328.7, 264/1.25; 425/168, 572, 574, 575, 576, 577, 588, DIG. 58, 468, 568; 249/205

(56) References Cited

U.S. PATENT DOCUMENTS

| 4,565,518 | * | 1/1986 | Altman et al. ....................... 425/568 |
| 4,958,676 | * | 9/1990 | Kuntz .................................. 425/577 |
| 5,034,170 | * | 7/1991 | Briggs, Jr. et al. ............... 264/328.7 |
| 5,061,168 | * | 10/1991 | Fox ............................... 425/DIG. 58 |
| 5,193,133 | * | 3/1993 | Schofield et al. ..................... 385/85 |

* cited by examiner

Primary Examiner—Tim Heitbrink
(74) Attorney, Agent, or Firm—Bell, Boyd & Lloyd

(57) ABSTRACT

An apparatus for injection molding of a fiber optic ferrule including the use of adjustable core and receiver members to precisely locate a core pin and also a projecting wire member in a mold where the core pin defines an interior passage in the molded ferrule and the projecting wire forms a small diameter longitudinal hole in the ferrule communicating with an outer end of the interior passage so that the interior passage and small diameter hole are precisely located relative to the body of the molded ferrule.

14 Claims, 3 Drawing Sheets

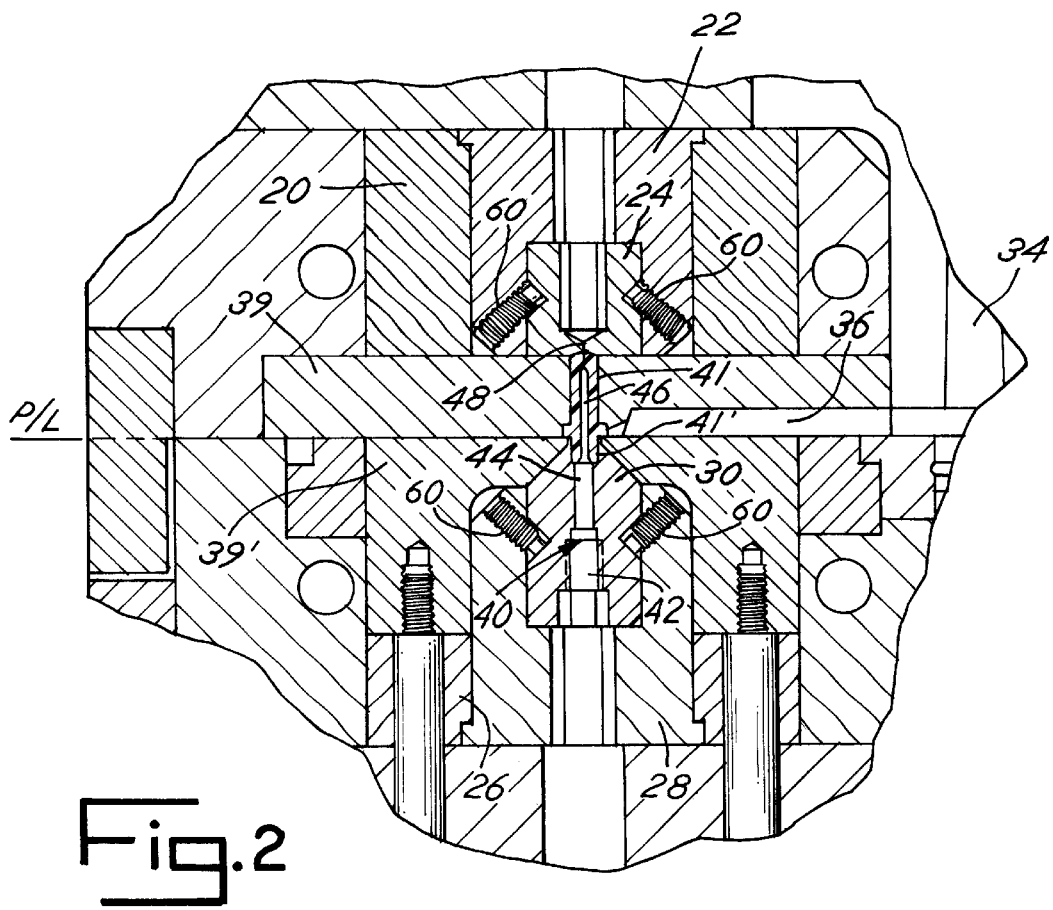
Fig.2
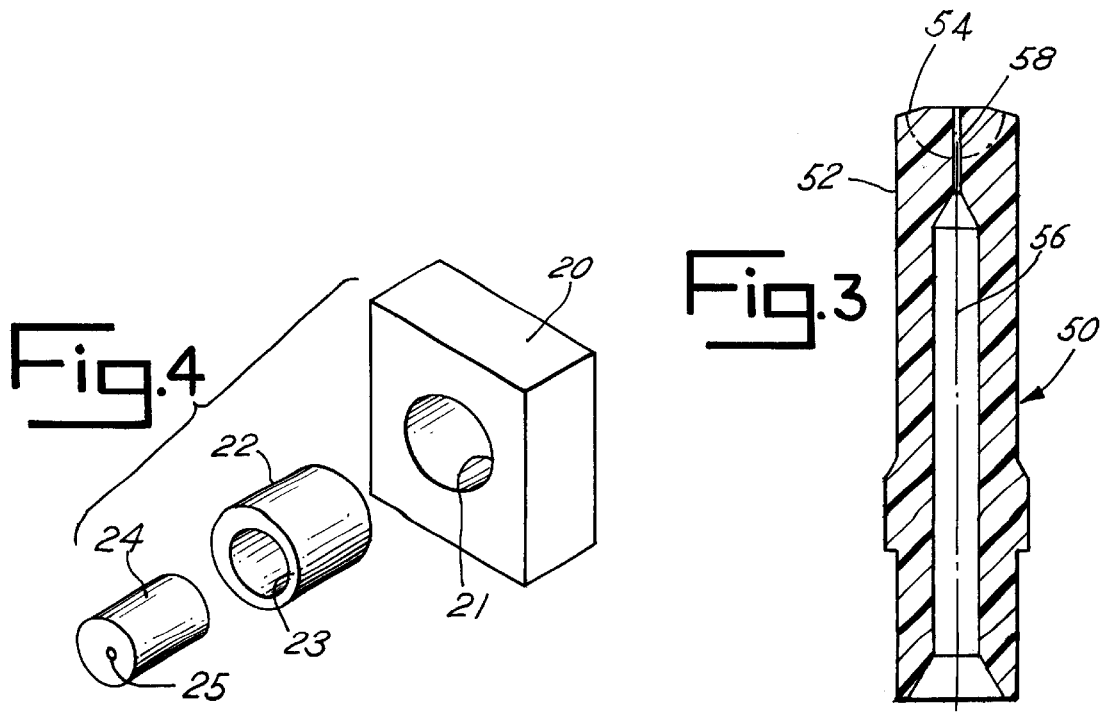
Fig.4
Fig.3

METHOD AND APPARATUS FOR PRECISION INJECTION MOLDING OF FIBER OPTIC FERRULES

CROSS REFERENCE TO RELATED APPLICATION

This is a continuation, application Ser. No. 08/225,517, filed Apr. 11, 1994 now abandoned which is a continuation, of application Ser. No. 08/101,469, filed Aug. 2, 1993 now abandoned which is a continuation of application Ser. No. 07/829,408, filed Feb. 3, 1992 now abandoned.

BACKGROUND OF THE INVENTION

Field of the Invention

The invention relates to an alignment ferrule which is made from injection molded plastic and is intended for use in a fiber optic connector or the like. Such ferrules are commonly referred to as 2.5 mm ferrules, and each such ferrule has a main axial passage to receive a fiber optic cable. The passage terminates in a very small diameter hole for receiving a projecting fiber optic member. In use, a pair of such ferrules are positioned in abutting relation in a fiber optic connector so a corresponding pair of fiber optics may be precisely abutted in end-to-end relation for transmission of an optical signal.

The effectiveness of such a connection between two or more fiber optic members depends upon the precision of the alignment of the abutting fiber optic members. If such fiber optic members are not precisely aligned with one another, a resulting loss of signal will impair the effectiveness of the connection. Due to the minute tolerances associated with fiber optic connectors, known molding technology has not been able to produce products within specified limitations. Known molding technology yields tolerances to the fourth decimal point at best, whereas fiber optic technology demands tolerance limitations to at least the fifth decimal point. Therefore, one object of the present invention relates to a method and apparatus for adjusting out excessive tolerances associated with known molding technology.

The present invention relates to a combination of adjustable core and receiver members which serve to precisely locate a core pin and also a projecting wire member in a mold for purposes of injection molding of alignment ferrules of the type above described. As is known in the art, such a core pin is positioned in the mold, and plastic material is molded around the core pin during a molding operation to form the desired 2.5 mm plastic ferrule. Thus, a portion of the body of the core pin defines an axial opening or passage in the ferrule for receiving a fiber optic cable. In addition, the small diameter wire projecting from one end of the core pin defines a small diameter hole at one end of the molded ferrule which receives and holds the fiber optic member which is to be precisely aligned with a like fiber optic member in a fiber optic connector or the like.

A method intended to increase the accuracy of molding a conical connector plug for a biconical fiber optic connector is shown in U.S. Pat. No. 5,034,170. The method disclosed in the '170 patent is for molding of a hollowed-out, apertured, conical plug which has a projecting pedestal at its small or forward end and a small diameter longitudinal hole in the pedestal to hold and position a projecting fiber optic member. The foregoing patent in FIG. 2 shows use of a pair of inner and outer conical cams 40 and 42 to increase the accuracy of the pedestal hole relative to the axis of the molded plug.

More specifically, the '170 patent in FIG. 2 shows a core pin 36 having a forward conical end in which is mounted a stepped pin 38. The stepped pin 38 comprises an extension of the core pin 36 and its smallest end projects into a small hole formed at the base of a recess 39 formed in the front face 43 of an inner cam member 40. By selective rotation of the inner and outer cams 40 and 42, the small hole at the base of the indentation 39 in the front face 43 of the inner cam 40 can be moved to a desired location relative to the longitudinal axis of the mold cavity which forms the plug 32.

By repositioning that hole into which the small end of the stepped pin 38 projects, it is possible to control the position of the small end of that stepped pin and thereby control with increased accuracy the location of the hole which is formed in the molded pedestal on the front of the molded plug 32. In the foregoing manner, it is possible to control the location of the axis of the pedestal hole relative to the axis of the plug profile.

The present invention is significantly different from the disclosure in U.S. Pat. No. 5,034,170 in many significant respects. According to the present invention, a pair of inner and outer rotatable nested cylinders are used to increase the accuracy of locating a hole in the mold fixture. However, beyond that there is little similarity in the respective inventions.

According to the present invention, the object to be molded is an alignment ferrule which is generally cylindrical in configuration and has a relatively large passage to receive a fiber optic cable, the passage being in communication with a small longitudinal hole to receive and position a fiber optic which is to be abutted with another such fiber optic in a connector or the like.

The present invention relates to a method and apparatus for injection molding of a plastic alignment ferrule. The apparatus includes two different nested cylinder assemblies, and each assembly preferably comprises a pair of inner and outer cylinders which are both rotatable and where the inner cylinder includes an eccentric locating aperture in its end face for receiving and positioning a mold element. Rotation of the outer cylinder will carry the inner cylinder with it thereby causing the eccentric aperture in the end face of the inner cylinder to move to its true center on the "Y" axis. Rotation of the outer cylinder while holding the inner cylinder will cause the eccentric aperture in the end face of the inner cylinder to move to its true center on the "X-Y" axis. Accordingly, by a combination of cylinder rotations, the locating aperture in the end face of the inner cylinder may be located precisely in a desired position.

An important feature of the present invention involves the use of two nested cylinder assemblies of the foregoing type. A first assembly includes an inner cylinder having a relatively large opening to receive and support a core pin which is used as a mold element to form an internal fiber optic cable passage in a molded plastic ferrule. A second assembly includes an inner cylinder having a very small hole to receive and support a small wire which projects axially from the end of the core pin, whereby operation of the second assembly will serve to locate the projecting wire in a precise manner.

Thus, in accordance with the present invention there are two nested cylinder assemblies which respectively locate independently and in a precise manner both a core pin and also a small wire projecting from one end of the core pin. In the foregoing manner, it is possible to assure that not only the core pin itself is accurately located and aligned relative to the mold cavity for molding the plastic ferrule, but also there is an independent cylinder assembly which controls in a precise manner the location of a small wire which projects from the end of the core pin and serves the purpose of defining a tiny hole in the molded ferrule for receiving and locating a fiber optic which projects from a fiber optic cable and is to be abutted in precise mating relation with a like fiber optic in a fiber optic connector.

In accordance with the invention as above described, one inner cylinder member adjusts the position of a core pin in a mold, and a second inner cylinder member adjusts the position of a projecting wire which projects from the forward end of the core pin. The mold parting line is transverse to the longitudinal axis of the mold cavity with the result that the foregoing projecting wire will repeatedly be inserted and withdrawn from the small eccentric hole in the second inner cylinder member as the mold is closed and opened. However, it is preferred to have the mold halves open and close in the direction of the longitudinal axis of the molded alignment ferrule to avoid any parting line flash on the outer diameter of the molded ferrule. The adjustable core and receiver concept of the present invention thus involves adjustment of both the core and the receiver to their true centers by mounting both the core pin and receiver into corresponding inner eccentric cylinders.

In accordance with a feature of the present invention, the adjustment of the core pin and the receiver are accomplished when the mold is removed from a molding press and each of the two cylinder assemblies is located in a respective half of the mold. Such adjustment is accomplished by use of known inspection equipment whereby an operator can locate the eccentric hole in each of the two inner cylinders into a desired position and then lock the two inner cylinders in position to precisely locate independently both the core pin itself and the projecting wire member when the mold halves are subsequently inserted into a molding press and closed. The foregoing contrasts with the method disclosed in U.S. Pat. No. 5,034,170 where the adjustment is made while the mold is positioned in a molding press. The method and apparatus of the present invention have application to 2.5 mm single mode and multimode fiber optic technology.

The primary object of the present invention is to provide a combination of adjustable core and adjustable receiver means for use in the molding of alignment ferrules known as 2.5 mm ferrules so as to assure not only the precise location in the mold of a core pin per se, but also to independently assure the precise location of a small diameter wire projecting from the core pin. In the foregoing manner, not only is the projecting wire precisely located, but in addition the wire is maintained in a straight or longitudinal position due to the independent longitudinal alignment and positioning of the core pin from which the wire projects.

The foregoing and other objects and advantages of our invention will be apparent from the following description of a preferred embodiment thereof, taken in conjunction with the accompanying drawings.

DESCRIPTION OF THE DRAWINGS

FIG. 2 is an enlarged fragmentary vertical sectional view of the mold components of FIG. 1;

FIG. 3 is a detail longitudinal sectional view of a 2.5 mm plastic ferrule of the type which is molded according to the method and apparatus of the present invention;

FIG. 4 is an exploded schematic perspective view of a cylinder assembly comprising a cylinder housing and a pair of nested cylinders which comprise components of the present invention.

Now, in order to acquaint those skilled in the art with the manner of making and using our invention, there will be described, in conjunction with the accompanying drawings, a preferred embodiment thereof.

DETAILED DESCRIPTION OF THE INVENTION

Figure 1:
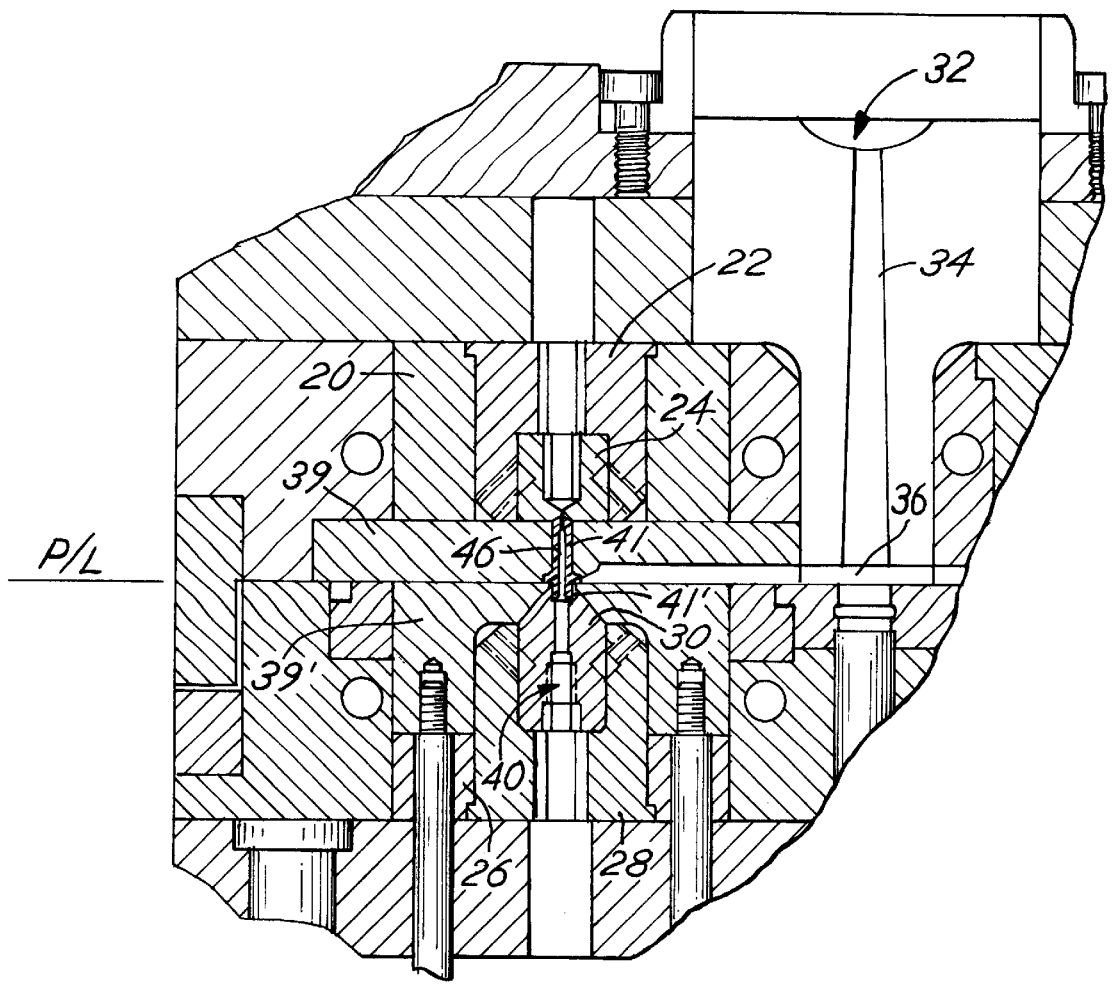
FIG. 1 is a vertical sectional view of a pair of mold halves in closed position in a molding press, the mold halves including a pair of nested cylinder assemblies for locating mold insert members in accordance with the present invention.

FIG. 1 shows a pair of mold halves in closed position in a molding press for molding a 2.5 mm plastic ferrule in accordance with the present invention. There is shown a first cylinder housing member 20 which has a cylindrical bore to receive an outer cylinder 22 which may be rotated in the housing 20. The outer cylinder 22 has an eccentric hole or bore formed therein to receive an inner rotatable cylinder 24 which has a tiny eccentric hole formed in its lower face as viewed in FIG. 1. As will be described more fully later herein, adjustment of the foregoing cylinder members is intended to be accomplished when the mold halves are removed from the molding press and separated from one another.

FIG. 1 shows a parting line P/L which indicates the line of separation between the upper and lower mold halves. Beneath the parting line P/L, a second cylinder assembly is shown comprising a second cylinder housing member 26, and a second outer rotatable cylinder 28 which is rotatable in the housing 26 and includes an eccentric bore to receive a second inner rotatable cylinder 30 which is provided with an eccentric bore or hole in its upper face which is substantially larger than that formed in the inner cylinder 24. As will be described more fully, each of the inner rotatable cylinders 24 and 30 serves a locating function to precisely locate a mold insert member. As shown in FIG. 1, with the upper and lower mold halves in closed position in a molding press, the molten plastic material is injected at a plastic inlet 32 and flows down through a passage 34 to a horizontal passage 36.

In the embodiment illustrated, two mold cavities are shown for simultaneous molding of two plastic ferrule members, and for that reason the plastic passage 36 extends both left and right from the lower end of passage 34. However, only the left-hand cavity in FIG. 1 will be described. The molten plastic passage 36 extends to the left to a mold cavity which is defined by the lower face of the upper rotatable cylinder 24, the upper face of the lower rotatable cylinder 30, a mold element 39 which is located in the upper mold half and has a central bore 41 to define the ferrule body, and a core pin 40 having a smaller diameter upper end portion 46 which is located in bore 41 and from which projects a much smaller diameter wire 48 as shown in FIG. 2. In the embodiment shown in FIG. 1, a second mold element 39' is located in the lower mold half in abutting relation at the mold parting line with the first mold element 39 and mold element 39' has a central bore 41' which is aligned with bore 41 to define a mold cavity for molding the ferrule body.

Reference is now made to FIG. 2 which is an enlarged sectional view of the left-hand mold cavity of FIG. 1, and also to FIG. 3 which is an enlarged detail view of a 2.5 mm ferrule of the type which is molded in the above-described mold cavity in accordance with the present invention. The lowermost inner rotatable cylinder 30 has a stepped bore therein to receive the core pin 40. The lower end of the core pin 40 is shown at 42 which is the largest diameter portion thereof. Above the portion 42 is a smaller diameter core pin portion 44, and the upper end of the core pin 40 which is the smallest diameter portion thereof is shown at 46. Projecting upwardly from the upper end of the core pin segment 46 is a small diameter wire 48.

The purpose of the foregoing will be better understood with reference to FIG. 3 which illustrates a 2.5 mm plastic ferrule of the type which is molded in accordance with the method and apparatus of the present invention. The ferrule is generally indicated at 50 and includes a cylindrical body 52 and a flange 54. As is known in the art, the cylindrical body 52 has an outer diameter of 2.5 mm throughout its length except for the larger diameter flange 54. The ferrule 50 is formed with an internal passage 56 which is intended to receive a fiber optic cable. At the upper end of the passage 56 as viewed in FIG. 3, there is a small diameter hole 58 which extends from the passage 56 to an outer face 54 of the ferrule 50. By way of example, the hole 58 may have a diameter of 125 microns. As is known in the art, a fiber optic cable is inserted into the passage 56 so a projecting fiber optic member, from which outer layers of insulation have been removed, extends through the small diameter hole 58 with its extreme end flush with the face 54.

It will be understood that in use such a ferrule will be abutted with a like ferrule in which a fiber optic is positioned in the small diameter hole 58, and the two ferrules will be abutted in end-to-end relation in a connector or the like to effect an abutting connection between the ends of the two fiber optic members. A 2.5 mm alignment ferrule of the foregoing type and the manner in which a fiber optic element is located therein for abutting with a like fiber optic element is described in Schofield, Stonikas and McGinley U.S. Pat. No. 5,193,133, entitled Fiber Alignment Ferrule With Polishing Pedestal, and assigned to the assignee of the present invention.

The function of the mold insert elements shown in FIG. 2 will be understood from the molded ferrule shown in FIG. 3. Thus, it is the small diameter portion 46 of the core pin 40 (see FIG. 2) which forms the passage 56 in the ferrule 50 during an injection molding operation. The shape of the core pin portion 46 corresponds to the shape of the passage 56 in the ferrule 50. Moreover, the above-mentioned projecting wire 48 which extends upwardly from the upper end of the core pin 40 as viewed in FIG. 2 serves to form the small diameter passage 58 in the upper end of the plastic ferrule 50 as viewed in FIG. 3. Accordingly, the diameter of the wire 48 controls the diameter of the passage 58 which in turn receives and controls the position of a fiber optic member when two such ferrules 50 are utilized in a fiber optic connector.

Still referring to FIG. 3, the concentricity of the small diameter passage 58 relative to the longitudinal axis or true center of the ferrule body 52 is extremely important because that concentricity, which preferably is maintained within three microns, determines the accuracy of fiber optic alignment when two such ferrules are mounted in a connector for the purpose of abutting two fiber optic elements in end-to-end relation to effect an optical connection therebetween. As previously explained, such fiber optic elements are extremely sensitive to any misalignment which results in a loss of signal. A significant feature of the present invention resides in the use of two separate rotatable cylinder assemblies, one of which is located in the lower mold half as viewed in FIG. 2 to control the position of the core pin 40, and the other of which is located in the upper mold half to control the position of the projecting wire element 48.

Referring again to FIG. 3, it would be possible to control the location of the projecting wire element 48 and thus of the fiber optic passage 58 in the ferrule 50 by use only of the cylinder assembly in the upper half of the mold shown in FIG. 2. However, if the core pin 40 itself were not precisely positioned and aligned, control only of the wire element 48 relative to the longitudinal axis of the mold cavity could result in undesirable bending of the wire element 48 and thereby cause formation of a passage 58 which is not precisely longitudinal. In accordance with the present invention, the use of the second cylinder assembly in the lower half of the mold effects precise positioning and alignment of the core pin 40 itself relative to the longitudinal axis of the mold cavity.

As a result, with both the core pin 40 and the projecting wire 48 independently positioned and aligned in a precise manner relative to the longitudinal axis of the mold cavity, the resulting molded ferrule 50 as shown in FIG. 3 is precise in the sense that the main fiber optic passage 56 is concentrically located and aligned relative to the longitudinal axis or true center of the ferrule body 52 and, in addition, the small diameter fiber optic passage 58 is also concentrically located and aligned relative to the longitudinal axis or true center of the ferrule body 52.

As shown in FIG. 2, the upper inner rotatable cylinder 24 has a small opening which receives the projecting wire element 48 when the mold halves are in closed position in the molding press. In addition, the lower inner rotatable cylinder 30 has an eccentric hole to receive and support the lower end of the core pin 40 so that adjustment of the cylinder 30 controls the position of the core pin 40 in the mold.

FIG. 2 shows the upper inner cylinder 24 which abuts against the top of the upper mold plate 39 and has a recessed central portion which defines one end of the mold cavity and includes the tiny hole to receive the wire element 48. The lower inner cylinder 30 has a frustum-shaped upper end that is received in a conical recess in the underside of the lower mold plate 39'. It should be understood that the various inner and outer cylinders are rotated for adjustment purposes and locked in position prior to being inserted into the molding press and closed as shown in FIG. 2.

Reference is now made to FIGS. 4 and 5a through 5g for a description of the operation of the two cylinder assemblies of the present invention. Since the two cylinder assemblies are essentially the same, except that the upper inner cylinder 24 has only a small diameter opening to receive the projecting wire 48, while the lower inner cylinder 30 has a larger stepped passage to receive and support the core pin 40, only the upper cylinder assembly will be described because their operation is essentially the same.

Bearing in mind that FIG. 4 and FIGS. 5a through 5g are schematic illustrations, FIG. 4 shows the cylinder housing 20 having a bore 21 for receiving the rotatable outer cylinder 22. The outer cylinder 22 has an eccentric bore 23 formed therein to receive the inner rotatable cylinder 24. The inner cylinder 24 has a small eccentric hole 25 formed in its front face which as explained above in conjunction with FIG. 2 serves to receive and position the projecting wire 48.

Figure 5A:
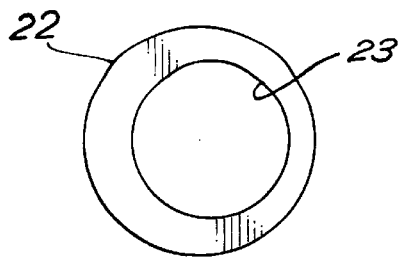
FIGS. 5a through 5g are schematic illustrations of various positions of the nested cylinders of FIG. 4.
Figure 5B:
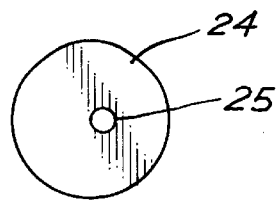
Figure 5C:
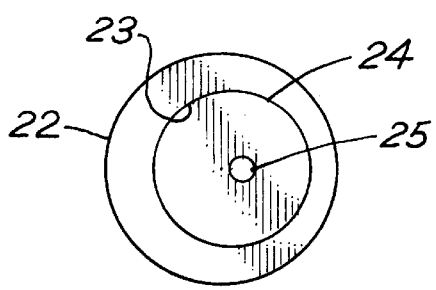
Figure 5D:
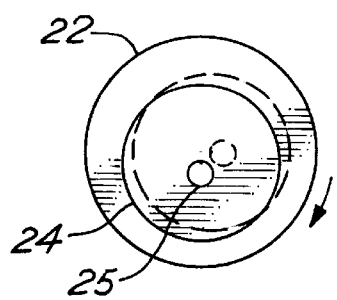
Figure 5E:
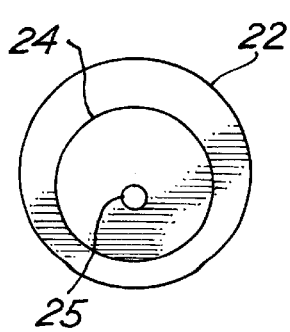
Figure 5F:
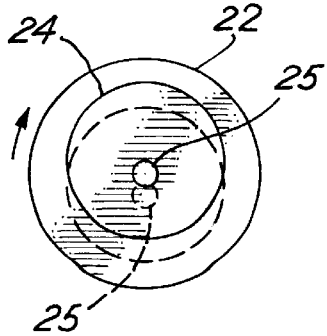

FIG. 5a shows the outer rotatable cylinder 22 having an eccentric bore 23, FIG. 5b shows the inner cylinder 24 having an eccentric hole 25, and FIG. 5c shows the inner cylinder 24 positioned in the bore 23 for rotation therein. FIG. 5d illustrates the cylinders of FIG. 5c after the outer cylinder 22 has been rotated in a clockwise direction thereby carrying the inner cylinder 24 with it to change the position of the hole 25 from that shown in dotted lines to the position shown in solid lines. FIG. 5e illustrates the solid line position of the hole 25. FIG. 5f represents a further clockwise rotation of outer cylinder 22, but with inner cylinder 24 being held against rotation. In the latter instance, the hole 25 has been moved from the dotted line position to the solid line position shown in FIG. 5f, the solid line position being shown in FIG. 5g.

Figure 5G:
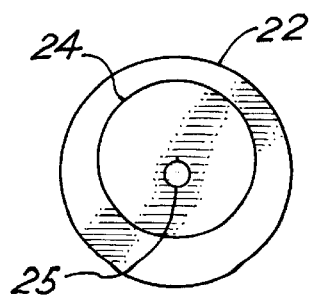

The foregoing illustrates the manner in which a pair of inner and outer rotatable cylinders may be rotated either by rotating the outer cylinder and permitting the inner cylinder to be carried along, or by rotating the outer cylinder while holding the inner cylinder against rotation. When the outer cylinder 22 is rotated clockwise as illustrated in FIG. 5d, the eccentric hole 25 is located on its true "Y" axis as shown by FIGS. 5d and 5e. When the outer cylinder 22 is again rotated clockwise while holding the inner cylinder 24 against rotation, the eccentric hole 25 is located on true center on the "X-Y" axis as shown in FIGS. 5f and 5g. Thereafter, the inner cylinder is locked in its desired position.

As previously explained, the inner cylinder 24 in the upper half of the mold as shown in FIG. 2 is designed to have a very small hole to receive and control the position of the wire element 48 when the mold is closed. In addition, the inner cylinder 30 in the lower half of the mold is designed to have a larger opening to receive and support the lower end 42, 44 of the core pin 40 so that the upper portion 46 of the core pin may be adjustably positioned concentric with the mold cavity which forms the ferrule body 52 as shown in FIG. 3.

When the mold halves are opened and removed from the molding press, the desired adjustments are made to the inner and outer cylinder members 22, 24, 28 and 30 to place the core pin 40 and also the wire element 48 which projects from the core pin in precise locations relative to the axis of the mold cavity which forms the ferrule body 52. After such adjustments are made, the inner cylinders are locked in their desired positions by various locking screws shown at 60 in FIG. 2. Thereafter, the mold halves are inserted into the molding press and closed to the position shown in FIG. 2 for an injection plastic molding operation.

When the mold halves are in closed position as shown in FIG. 2, the wire element 48 (FIG. 2) is located in the eccentric hole 25 (FIGS. 5a–g) of the inner cylinder 24. Also, the core pin 40 is supported in a comparable but larger eccentric opening in the inner cylinder 30 in the lower half of the mold. As the mold opens, the core pin 40 remains mounted in the lower inner cylinder 30 while the wire element 48 is withdrawn from the upper inner cylinder 24.

It should be understood that in describing the upper and lower mold halves in FIGS. 1 and 2, the terms "upper" and "lower" are used by way of example only due to the orientation of the drawings. The molding press may be located horizontally so that the portion of the mold referred to as "upper" may be termed the front half of the mold and the mold portion referred to as the "lower" half of the mold may be termed the back half of the mold.

What is claimed is:

1. Adjustable mold apparatus for injection molding of a fiber optic ferrule, said mold apparatus comprising, in combination, a mold having a bore therein to define a cylindrical mold cavity for molding a body portion of a ferrule, core pin means having a segment thereof designed to define an interior longitudinal passage in said body portion of said ferrule, said core pin means having wire means projecting from a forward end thereof to define a small diameter longitudinal hole in said ferrule communicating with the outer end of said interior longitudinal passage, first adjustable means for locating said wire means, said first adjustable means being positioned in a first half of said mold and including first rotatable means having a small eccentric hole dimensioned to receive and position said wire means when said mold is closed, second adjustable means for locating said core pin means, said second adjustable means being positioned in a second half of said mold and including second rotatable means having an eccentric hole for receiving and supporting a rear portion of said core pin means while a forward portion of said core pin means including said wire means projects into said bore in said mold when said mold is closed, whereby said first adjustable means may be used to locate said projecting wire means substantially concentric with the true center of said bore in said mold and said second adjustable means may be used to locate said core pin means substantially concentric with said true center of said bore in said mold.

2. Adjustable mold apparatus as defined in claim 1 where an inner face of said first rotatable means defines one end of said mold cavity.

3. Adjustable mold apparatus as defined in claim 2 where an enlarged portion of said core pin means together with an inner end portion of said second rotatable means defines an opposite end of said mold cavity.

4. Adjustable mold apparatus as defined in claim 1 where said mold apparatus has a parting line transverse to the longitudinal axis of said mold cavity whereby when said mold opens said core pin means remains supported in said second rotatable means and said wire means is withdrawn from said first rotatable means.

5. Adjustable mold apparatus as defined in claim 4 where said first and second adjustable means are used to adjust the location of said core pin means and to independently adjust the location of said wire means when the mold halves are open and removed from a molding press.

6. Adjustable mold apparatus as defined in claim 1 where said first adjustable means includes first cylinder housing means having a first cylindrical bore, first outer rotatable cylinder means mounted in said first cylindrical bore and having a first eccentric bore therein, and said first rotatable means comprises a first inner rotatable cylinder means having said small eccentric hole in its end face, whereby said small eccentric hole may be located in a desired position on an X-Y axis by selective rotation of said first outer and inner rotatable cylinder means.

7. Adjustable mold apparatus as defined in claim 6 where said second adjustable means includes second cylinder housing means having a second cylindrical bore, second outer rotatable cylinder means mounted in said second cylindrical bore and having a second eccentric bore therein, and said second rotatable means comprises second inner rotatable cylinder means having said eccentric hole in its end face, whereby said eccentric hole may be located in a desired position on an X-Y axis by selective rotation of said second outer and inner rotatable cylinder means.

8. Adjustable mold apparatus as defined in claim 7 where said mold means includes first and second parallel mold plates which have aligned bores to define said cylindrical mold cavity, and said second parallel plate includes a conical recess which receives a frustum-shaped inner end portion on said second inner rotatable cylinder means.

9. Adjustable mold apparatus for injection molding of a fiber optic ferrule, said mold apparatus comprising, in combination, a mold having a bore therein to define a cylindrical mold cavity for molding a body portion of a ferrule, core pin means having a rear mounting portion and a forward portion designed to define an interior longitudinal passage in said body portion of said ferrule, said forward portion of said core pin means having wire means projecting therefrom including an outer end wire portion and an intermediate wire portion for defining a small diameter longitudinal hole in said ferrule communicating with the outer end of said interior longitudinal passage, first adjustable means for locating said wire means, said first adjustable means being positioned in a first half of said mold and including first rotatable means having a small eccentric hole dimensioned to receive and position said outer end wire portion when said mold is closed, second adjustable means for locating said core pin means, said second adjustable means being positioned in a second half of said mold and including second rotatable means having an eccentric hole for receiving and supporting said rear mounting portion of said core pin means while said forward portion of said core pin means including said wire means project into said bore in said mold and said outer end wire portion projects into said small eccentric hole in said first rotatable means when said mold is closed while said intermediate wire portion is disposed in said bore to partially define said mold cavity, whereby when said mold is open and said first and second halves of said mold are removed from a molding press, said first adjustable means may be used to locate said projecting wire means substantially concentric with the true center of said bore in said mold and said second adjustable means may be used to locate said core pin means substantially concentric with said true center of said bore in said mold.

10. Adjustable mold apparatus as defined in claim 9 where said mold cavity is defined in part by an inner face of said first rotatable means, said bore in said mold means, said forward portion of said core pin means, and said intermediate wire portion.

11. Adjustable mold apparatus as defined in claim 10 where an inner face of said first rotatable means defines one end of said mold cavity and an enlarged portion of said core pin means together with an inner portion of said second rotatable means defines an opposite end of said mold cavity.

12. Adjustable mold apparatus for injection molding, said mold apparatus comprising, in combination, a mold having a bore, core pin means having a segment thereof designed to define an interior longitudinal passage, said core pin means having wire means projecting from a forward end thereof to define a small diameter longitudinal hole communicating with the outer end of said interior longitudinal passage, first adjustable means for locating said wire means, said first adjustable means being positioned in a first half of said mold and including first adjustable aperture means having a small eccentric hole dimensioned to receive and position said wire means when said mold is closed, second adjustable means for locating said core pin means, said second adjustable means being positioned in a second half of said mold and including second adjustable aperture means having an eccentric hole for receiving and supporting a rear portion of said core pin means while a forward portion of said core pin means including said wire means projects into said bore in said mold when said mold is closed, whereby said first adjustable means may be used to locate said projecting wire means substantially concentric with the true center of said bore in said mold and said second adjustable means may be used to locate said core pin means substantially concentric with said true center of said bore in said mold.

13. A method for injection molding of a fiber optic ferrule, the method comprising the steps of:
   providing a mold capable of molding a body of the ferrule;
   providing a core pin in said mold, said core pin capable of forming an interior longitudinal passageway in the body of the ferrule wherein position of the core pin is adjustable;
   providing a wire projecting from the core pin;
   adjusting the wire to a center of the body in the mold; and
   adjusting the core pin to the center of the body in the mold.

14. An apparatus for injection molding of a fiber optic ferrule, the apparatus comprising:
   a mold capable of molding a body of the ferrule; and
   a core pin in said mold, a wire projecting from said core pin said core pin capable of forming an interior longitudinal passageway of the body of the ferrule wherein position of the core pin is adjustable and further wherein the wire and the core pin are adjustable to the center of the body in the mold.

* * * * *